W. C. WILLIAMSON.
Hoisting-Machines.
No. 6,007. Reissued Aug. 11, 1874.
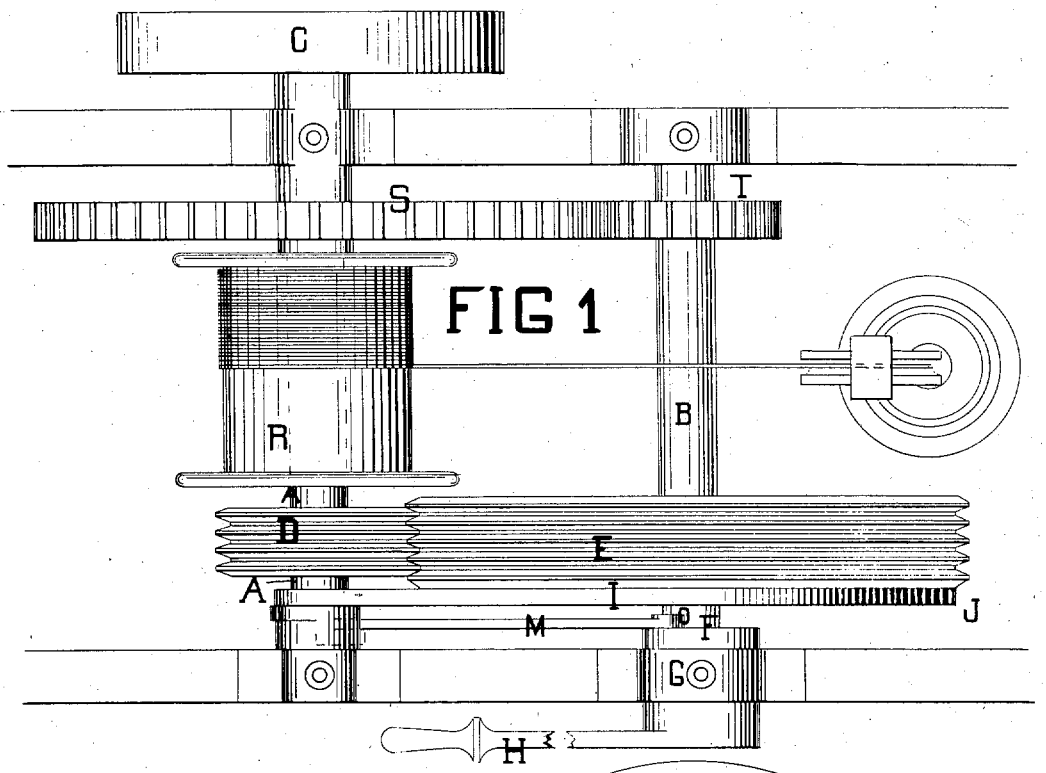
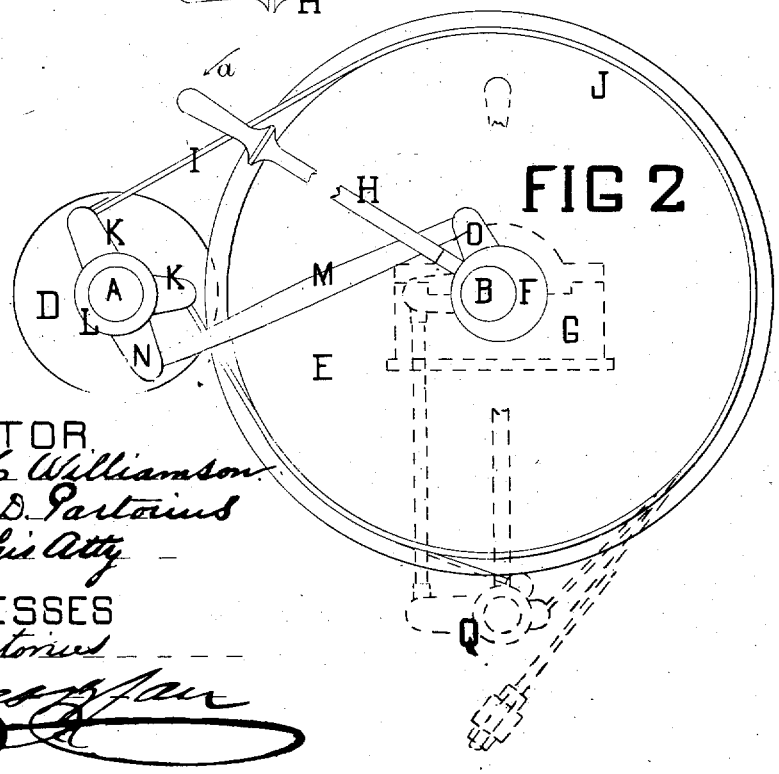
INVENTOR
William C. Williamson
by Francis D. Partoins
his Atty
WITNESSES
John Partoins
James [illegible]

UNITED STATES PATENT OFFICE.

WILLIAM C. WILLIAMSON, OF PHILADELPHIA, PENNSYLVANIA, ASSIGNOR TO WILLIAMSON BROTHERS, OF SAME PLACE.

IMPROVEMENT IN HOISTING-MACHINES.

Specification forming part of Letters Patent No. 106,642, dated August 23, 1870; reissue No. 6,007, dated August 11, 1874; application filed May 19, 1874.

*To all whom it may concern:*

Be it known that I, WILLIAM C. WILLIAMSON, of the city and county of Philadelphia and State of Pennsylvania, have invented an Improved Hoisting-Machine, of which the following is a specification:

The object of the invention is in a hoisting-machine, the combination of a driving-shaft with a counter-shaft, which is moved by a lever, which throws it into or out of contact with the driving-shaft and simultaneously releases or applies a brake-strap.

Figure 1 is a plan view. Fig. 2 is a side view of the friction-wheels, the brake-strap, and the mechanism used for starting, stopping, and braking.

A is the driving-shaft, and B the counter-shaft, of the machine. The driving-shaft is actuated either directly by an engine or by a pulley, C. Its motion is communicated to the counter-shaft by the friction-wheels D E on the shafts A B, respectively. The shaft B has a vibratory motion on its outer end as a center, which is caused and controlled by an eccentric, F, in the box G. The vibratory end of the shaft B is journaled in the eccentric F, so that any motion of it, by its lever H, either breaks or forms the contact of the friction-wheels D E. I is a brake-strap on the rim or flange J of the friction-wheel E. Its ends are attached to the arms K of the rocker L on the shaft A. M is a connecting-rod between the arm N of the rocker L and the arm O of the eccentric F. The lever H, when moved in the direction of the arrow *a*, throws the friction-wheels D E into contact, and at the same time loosens the brake-strap I, and thereby prepares the machine for hoisting. When the lever is turned in the opposite direction it moves the friction-wheels out of contact, and tightens the brake-strap I on the rim J, which stops the motion of the counter-shaft and the friction-wheel E.

If it should be thought desirable to use an independent rock-shaft, shown at Q, end view, Fig. 2, in place of the rocker L, then the counter-shaft B must be provided with an eccentric at each end.

R is a winding drum, and S a gear-wheel, which are connected and turn loosely on the shaft A. The gear-wheel S meshes with a gear-wheel, T, on the counter-shaft B, whereby the rotary motion of the shaft is transmitted to the drum. The drum can be secured to the shaft A to turn with it, in which case the gear-wheels S T must be dispensed with.

I claim as my invention—

In a hoisting-machine, the combination of the driving-shaft with the counter-shaft, which is moved by the eccentric lever, which throws it into or out of gear with the driving-shaft, and simultaneously releases or applies a brake-strap.

In testimony whereof I hereunto sign my name in presence of two subscribing witnesses.

WM. C. WILLIAMSON.

Witnesses:

FRANCIS D. PASTORIUS,
GEORGE MARTIN.